United States Patent [19]

Deane

[11] Patent Number: 5,129,741
[45] Date of Patent: Jul. 14, 1992

[54] HUB ASSEMBLY WITH INTEGRAL ABS EXCITER RING SEAL

[75] Inventor: Alastair R. Deane, Novi, Mich.
[73] Assignee: The Budd Company, Troy, Mich.
[21] Appl. No.: 680,825
[22] Filed: Apr. 5, 1991
[51] Int. Cl.$^5$ ............................ F16C 19/08; G01P 3/48
[52] U.S. Cl. ..................................... 384/448; 310/168; 324/207.25
[58] Field of Search ............... 384/448; 310/168, 155; 324/173, 207.25; 73/494

[56] References Cited

U.S. PATENT DOCUMENTS

| | | | |
|---|---|---|---|
| 3,500,091 | 4/1968 | Jones | 310/168 |
| 3,890,517 | 6/1975 | Marsh et al. | 324/173 X |
| 4,097,756 | 6/1978 | Gee | 310/155 |
| 4,161,120 | 7/1979 | Cloarec | 73/494 |
| 4,171,495 | 10/1979 | McNinch, Jr. | 310/155 |
| 4,259,637 | 3/1981 | Bloomfield et al. | 324/166 |
| 4,667,156 | 5/1987 | Machino et al. | 324/173 |
| 4,732,494 | 3/1988 | Guers et al. | 384/448 |
| 4,783,180 | 11/1988 | Hayashi | 384/448 |
| 4,850,722 | 7/1989 | Bayer | 384/448 |
| 4,864,231 | 9/1989 | Okumura et al. | 324/173 |
| 4,884,901 | 12/1989 | Harsdorff | 384/448 |
| 4,915,199 | 4/1990 | Hayashi | 384/448 X |
| 4,932,245 | 6/1990 | Shelton | 324/173 X |
| 4,946,296 | 8/1990 | Olschewski et al. | 384/448 |
| 4,948,277 | 8/1990 | Alff | 384/448 |
| 4,968,156 | 11/1990 | Hajzler | 384/448 |

FOREIGN PATENT DOCUMENTS

| | | | |
|---|---|---|---|
| 2317995 | 11/1973 | Fed. Rep. of Germany | 324/173 |
| 2243331 | 3/1974 | Fed. Rep. of Germany | |
| 2375599 | 12/1976 | France | |
| 237249 | 9/1989 | Japan | 384/448 |

Primary Examiner—Thomas R. Hannon
Attorney, Agent, or Firm—Harness, Dickey & Pierce

[57] ABSTRACT

A hub assembly for a motor vehicle equipped with an anti-lock brake system in which the exciter ring for the ABS is press fit over the outer surface of the hub with the ring providing an inner cylindrical surface for a press fit mount of a seal assembly into the exciter ring rather than providing a mounting surface in the hub for the seal assembly. As a result, only the bearing race and the exciter ring are press fit to the hub. This configuration enables the exciter ring to be positioned radially outwardly from the bearing such that the bearing provides radial support to the hub beneath the exciter ring whereby distortion of the hub assembly components due to multiple press fit mounts is reduced, part to part variation is reduced and dimensional instability of the assembly is reduced.

6 Claims, 2 Drawing Sheets

HUB ASSEMBLY WITH INTEGRAL ABS EXCITER RING SEAL

BACKGROUND AND SUMMARY OF THE INVENTION

This invention relates to a motor vehicle hub assembly and in particular to a hub assembly having an anti-lock brake system (ABS) exciter ring with a seal mounted to the exciter ring.

In recent years, anti-lock brake systems are being found on an increasing number of passenger motor vehicles, including light duty trucks. The ABS detects wheel rotation and acts to relieve braking force applied to the vehicle's wheels to prevent a lock-up condition from occurring. Wheel brake locking is undesirable since it can result in longer stopping distances and directional instability of the vehicle. The most advanced ABS designs employ a sensor at each wheel subject to ABS control. The sensors detect wheel rotation using various technologies including slotted disc light sensor devices, inductive pick-ups, Hall effect devices, variable reluctance sensors, etc. Signals from the wheel rotation sensors are fed into an ABS computer which modulates the braking force.

Present sensors typically use some type of exciter ring, slotted disc, or other component that rotates relative to the sensor in response to wheel rotation. Hereinafter, the term "exciter ring" will be used to refer to any such device. Due to packaging constraints involving the hub, rotor and brake caliper, the exciter ring is usually pressed on the end of the hub. This location is adjacent to the inner bearing and an oil seal. The outer race of the inner bearing, the oil seal and the exciter ring are all press-fit assemblies that can cause distortion in the hub and in the pressed on components. The distortion causes assembly problems, part-to-part variation and dimensional instability in the hub assembly. The part-to-part variation and dimensional instability can be of particular concern because many ABS sensors require that a very precise clearance be maintained between the exciter ring and the sensor during wheel rotation. In addition, dimensional tolerances affect the metal-to-metal contact between the oil seal and the hub which must be a close fit to prevent grease leakage and ingress of contaminants into the bearing. Accordingly, it is an object of the present invention to provide a hub assembly that avoids or reduces the distortion caused by multiple press-fits in one area of the hub.

The hub assembly of the present invention includes an exciter ring which, when press-fit over the end of the hub, forms a cylindrical inner surface extending beyond the end of the hub. The oil seal assembly is press-fit into the inner surface of the exciter ring. Several advantages follow from mounting the oil seal assembly in the exciter ring rather than the hub member. One advantage is that one of the three press fits on the hub has now been removed from the hub itself and placed on the exciter ring. Another advantage is that the pilot diameter for the exciter ring has now been moved to a location radially outward from the inner bearing such that there is additional support for the hub, reducing distortion caused by the press-fit of the exciter ring. These two advantages work to reduce the distortion found in previous hub assemblies.

Yet another advantage of mounting the oil seal to the exciter ring is the absence of the seal mounting surface in the hub. Less material is required to cast the hub, thus reducing the hub weight and there is no longer a need for machining of a seal diameter on the hub. This improves productivity and reduces the part cost. In the illustrated embodiment of the present invention, the exciter ring is made by a powder metal manufacturing process. As a result, there is no machining required to produce a seal mounting diameter. With reduced distortion of the hub assembly components, the dimensional accuracy will be improved, resulting in improved ABS functioning due to reduced variation between assemblies.

Further objects, features and advantages of the invention will become apparent from a consideration of the following description and the appended claims when taken in connection with the accompanying drawings.

DETAILED DESCRIPTION OF THE INVENTION

Figure 1:
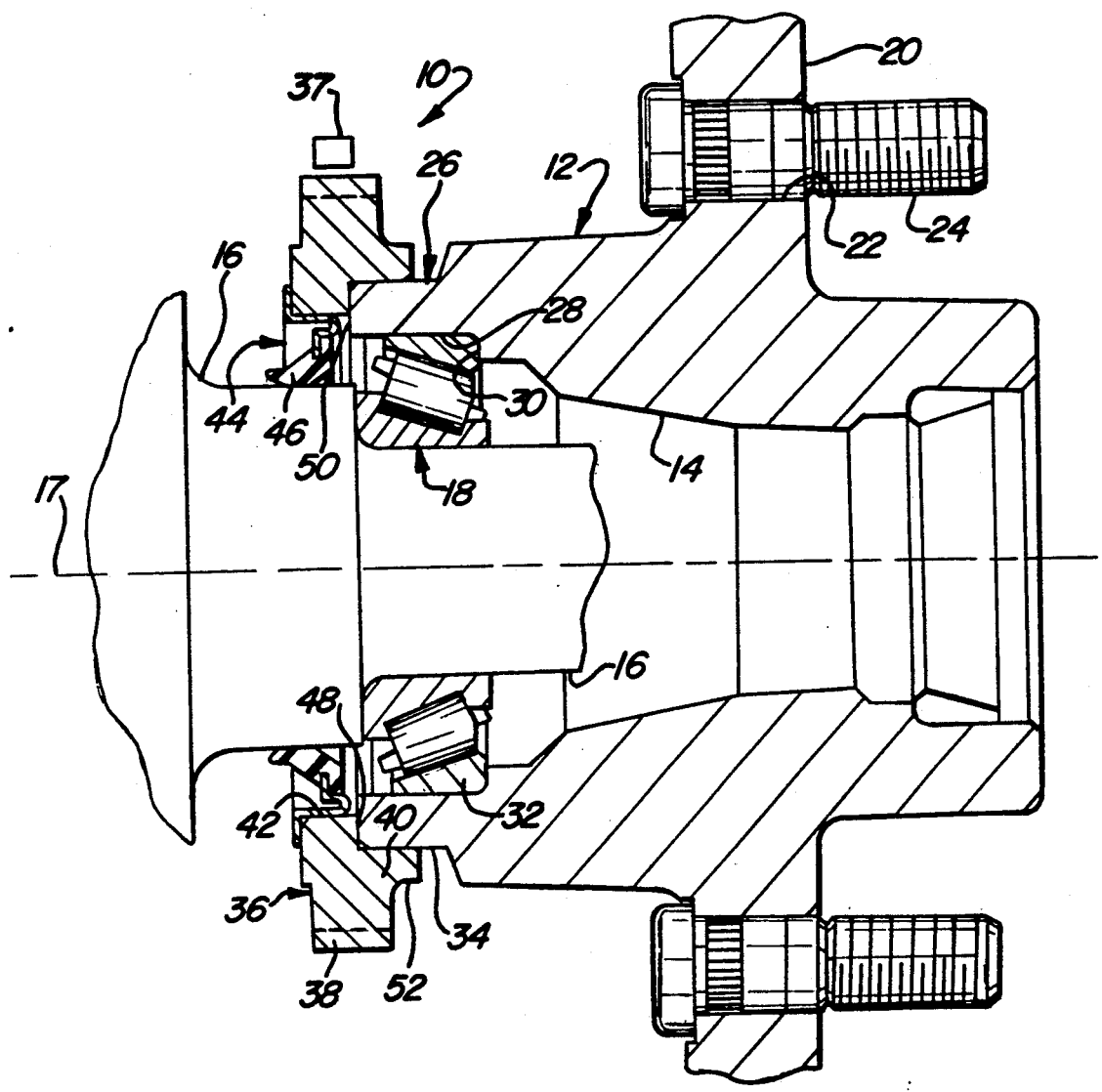
FIG. 1 is a sectional view of the hub assembly of the present invention.

The hub assembly of the present invention is shown in FIG. 1 and designated generally at 10. Hub assembly 10 includes a hub member 12 which defines a hollow passageway 14 adapted to receive a spindle 16. And inner bearing assembly 18 and an outer bearing assembly (not shown) are used to mount the hub member 12 on spindle 16 in a conventional manner for rotation about the axis 17 of the spindle. Hub member 12 forms a radially projecting wheel mounting flange 20 having a plurality of stud holes 22 with wheel studs 24 installed therein.

The inner surface of the passageway 14 forms a generally cylindrical inner surface 28 for mounting the bearing assembly 18 at the axial end portion 26 of the hub member. The inner surface of the passageway is stepped to form a shoulder 30 against which the outer race 32 of bearing assembly 18 is placed as the outer race is press-fit into the cylindrical inner surface 28 of the hub member. A portion of the inner surface 28 mounts the outer race 32 of the bearing.

The end portion 26 forms an outer cylindrical surface 34 onto which is press-fit an exciter ring 36. Exciter ring 36 is shown in the form of a gear having a plurality of teeth 38 spaced about the periphery of the ring. A stationary sensor 37 is positioned close to the teeth 38 so as to detect the rotation of the hub member 12 by movement of the teeth 38 past the sensor as the hub member and ring rotate.

The inner cylindrical surface of the exciter ring 36 includes a first ring mounting portion 40 which is press-fit over the outer cylindrical surface 34 of the hub member to mount the exciter ring on the hub member. The inner cylindrical surface of the ring also forms a second or a seal mounting portion 42 into which annular oil seal assembly 44 is press-fit. Seal assembly 44 includes a flexible lip 46 which engages the surface of spindle 16. The inner seal assembly 44, together with an outer seal assembly (not shown), seals an interior cavity formed between the spindle and the hub which contains necessary lubricant for the bearing assemblies.

As shown in FIG. 1, the diameter of the seal mounting portion 42 of the ring inner surface is of a smaller diameter than the ring mounting portion 40. This forms a radial shoulder 48 which abuts with the end surface 50 of the hub when the ring is press fit onto the hub. The shoulder advantageously serves as a stop to position the ring on the hub. However, the diameter of the seal mounting portion 42 can be the same or larger than the diameter of the ring mounting portion 40 if so desired.

Figure 2:
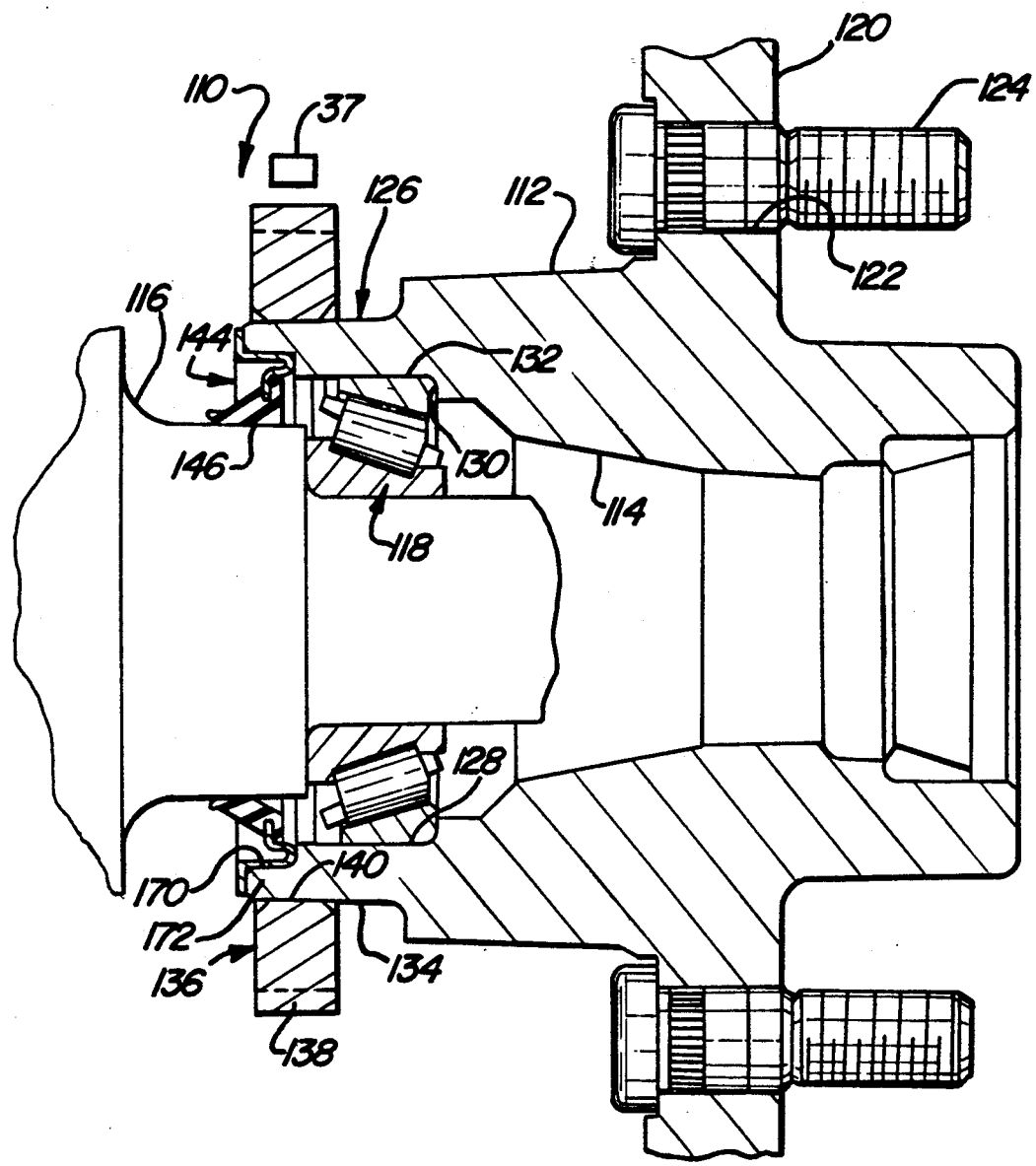
FIG. 2 is a sectional view of a prior art hub assembly.

The advantages of the hub assembly 10 can best be described with reference to a prior art hub assembly 110 shown in FIG. 2. The elements of hub assembly 110 that are similar to elements of hub assembly 10 are given the same reference numerals with the addition of 100. The inner cylindrical surface of the ring 138 only includes a ring mounting portion 140. The ring 138 does not include a seal mounting surface for the seal assembly 144. Instead, the end portion 126 of the hub member 112 forms a inner cylindrical surface 128 for the bearing race 132 and a second inner cylindrical surface 170 for the seal assembly 144. As a result, the end portion 126 has three items press-fit thereto, the outer race 132 of the bearing assembly, the exciter ring 138 and the seal assembly 144.

To provide the seal mounting surface 170 in the hub, the end portion 126 must be extended axially inwardly from the bearing assembly 118 forming a seal mounting portion 172 at the axial inner end of the hub 112. The exciter ring 136 is press-fit over the seal mounting portion 172 of the hub to mount the ring 136 at the axial inner end of the hub member 112. As a result, the ring 138 is axially spaced inwardly from the bearing race 132 such that there is no support for the hub radially inwardly from the exciter ring 136. The absence of any radial support beneath the ring 138, and the presence of three press-fit items: the bearing race, the exciter ring and the seal, all on the hub member end portion 126, results in the undesirable distortion, part-to-part variation and dimensional instability of the hub assembly.

By eliminating the seal mounting portion 172 from the hub, the ring 36 in hub assembly 10 is mounted to the hub member 12 radially outward from the bearing race 32 such that at least a portion of the exciter ring overlies the race 32. The bearing assembly now provides radial support for the hub end portion 26, reducing deformation of the hub caused by the press-fit of the exciter ring. The teeth 38 of the exciter ring 36 are positioned axially from the wheel mounting flange 20 the same distance as the teeth 138 are positioned in the prior art hub assembly 110. Thus, the clearances between the ring and the rotor and brake caliper have not been changed. The hub assembly according to this invention however, would permit the axial position of the exciter ring teeth 38 to be located both axially and radially over a wide range of positions.

However, since the hub member 12 does not include a seal mounting portion as found in hub member 112, the axial length of hub 12 is shorter. The teeth 38 of the ring are partially offset or overhang from the end 50 of the hub member. To provide a sufficiently large surface area 40 for mounting the ring, the ring is formed with an axially extending flange 52. The teeth 38 are also offset from the ring cylindrical mounting surface 40.

The hub assembly of the present invention is advantageous from a manufacturing standpoint because only the inner cylindrical surface 28 for the bearing and the outer cylindrical surface 34 for the ring need to be machined into the hub member 12. Machining of a seal surface into the hub member is eliminated. The exciter ring 36 can be formed using a powdered metal process in which an accurate surface 42 can be formed for mounting of a seal assembly 44 without requiring a machining operation.

The hub assembly 10 of the present invention reduces the number of press-fit mountings to the hub and provides direct radial support of the exciter ring. In addition, the machining cost of the hub has been reduced by eliminating a machined seal mounting surface. The hub assembly of the present invention has achieved the above advantages without any modifications to the bearing assembly 18 as compared with prior hub assemblies such that a special bearing assembly is not needed. Furthermore, the outer race of the bearing is fully supported along its axial length by the hub member.

It is to be understood that the invention is not limited to the exact construction illustrated and described above, but that various changes and modifications may be made without departing from the spirit and scope of the invention as defined in the following claims.

I claim:

1. A hub assembly for a motor vehicle of the type having an anti-locking raking system comprising:
   a hub member having means for affixing a wheel thereto and defining cylindrical outer and inner surfaces at one axial end, said inner surface having a bearing mounting portion;
   an exciter ring having an cylindrical inner surface with fist and second axial portions, said second axial portion of said exciter ring cylindrical inner surface having a smaller diameter than said first axial portion of said exciter ring cylindrical inner surface, said exciter ring being mounted on said hub member by press fitting said first axial portion of said exciter ring cylindrical inner surface on said hub member cylindrical outer surface with said second axial portion of said exciter ring cylindrical inner surface extending axially beyond said axial bend of said hub member, a radial shoulder formed on said exciter ring between said is and second axial portions and being seated against said axial end of said hub member; and
   a seal assembly press fit into the second axial portion of said exciter ring cylindrical inner surface, said seal assembly including a sealing lip extending generally radially inward from said second axial portion to contact a spindle of the motor vehicle.

2. The hub assembly of claim 1 wherein said first axial portion of said exciter ring cylindrical inner surface partially overlies said bearing mounting portion of said hub inner surface.

3. A hub assembly for a motor vehicle of the type having an anti-lock braking system comprising:
   a hub member having means for affixing a wheel thereto and defining cylindrical outer and inner surfaces at one axial end;
   a bearing outer race carried by said inner surface of said hub member; 'an exciter ring having a cylindrical inner surface, said ring inner surface having a ring mounting portion and a seal mounting portion, said ring being mounted to said hub member by a press fit of said ring mounting portion of said ring inner surface over said outer surface of said hub member with said ring mounting portion partially overlying said bearing outer race and said seal mounting portion of said ring inner surface extending axially beyond said end of said hub member; and
   a seal assembly press fit into said sal mounting portion of said ring inner surface, said sealing assembly including a sealing lip extending generally radially inward from said seal mounting portion to contact a spindle of the motor vehicle.

4. The hub assembly of claim 3 wherein a radially outer edge of said ring is formed with a plurality of axially aligned teeth with at least a portion of said teeth extending axially beyond said end of said hub member.

5. The hub assembly of claim 4 wherein said seal mounting portion of said ring inner surface is of a smaller diameter than said ring mounting portion of sad ring inner surface forming a radial shoulder between said ring mounting and seal mounting portions with said radial shoulder seated against said end of said hub member.

6. A hub assembly for a motor vehicle of the type having an anti-lock raking system comprising:
 a hub member having means or affixing a wheel thereto and defining cylindrical outer and inner surfaces at one axial end;
 a bearing outer race carried by said hub member inner surface said outer race being fully supported along the entire axial length of said outer race by said hub member inner surface;
 an exciter ring having a cylindrical inner surface, said ring inner surface having a ring mounting portion and a seal mounting portion, said ring being mounted to said hub member by a press fit of said ring mounting portion of said ring inner surface over said hub member outer surface with said ring mounting portion partially overlaying said outer race and said seal mounting portion of said ring inner surface extending axially beyond said end of said hub member, said seal mounting portion of said ring inner surface being of a smaller diameter than said ring mounting potion of said ring inner surface forming a radial shoulder between said ring mounting and seal mounting portions with said radial shoulder seated against said end of said hub member, said ring having a radially outer edge formed with a plurality of axially aligned teeth with at least a portion of said teeth extending axially beyond said end of said hub member; and
 a seal assembly press fit into said seal mounting portion of said ring inner surface, said sealing assembly including a sealing lip extending generally radially inward from said seal mounting portion to contact a spindle o the motor vehicle.

* * * * *

UNITED STATES PATENT AND TRADEMARK OFFICE
CERTIFICATE OF CORRECTION

PATENT NO. : 5,129,741
DATED : July 14, 1992
INVENTOR(S) : Alastair R. Deane

It is certified that error appears in the above-indentified patent and that said Letters Patent is hereby corrected as shown below:

Column 4, line 27, Claim 1 after "with" delete "fist" and insert --first--.
          line 37, Claim 1 delete "bend and insert --end--.
          line 38, Claim 1, delete "is" and insert --first--.
          line 56, Claim 3, after "member;" delete "'".
          line 67, Claim 3, after "said" delete "sal" and insert --seal--.

Column 5, line 11, Claim 5 after "of" delete "sad" and insert --said--
          line 17, Claim 6, after "anti-lock" delete "raking" and insert --braking--.
          line 23, Claim 6, after "surface" insert --with--.

Column 6, line 24, Claim 6, after "spindle" delere "o" and insert --of--.

Column 4, line 21, Claim 1, after "anti-locking" deleting "raking" and insert --braking--.

Signed and Sealed this

Second Day of November, 1993

Attest:

BRUCE LEHMAN

Attesting Officer      Commissioner of Patents and Trademarks